US006320348B1

(12) United States Patent
Kadah

(10) Patent No.: US 6,320,348 B1
(45) Date of Patent: *Nov. 20, 2001

(54) TIME RATE OF CHANGE MOTOR START CIRCUIT

(76) Inventor: Andrew S. Kadah, 5000 Hennaberry Rd., Manlius, NY (US) 13104

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/332,405

(22) Filed: Jun. 14, 1999

(51) Int. Cl.$^7$ ............................................ H02P 7/36
(52) U.S. Cl. ........................ 318/785; 318/781; 318/798
(58) Field of Search ................................ 318/781–783, 318/785, 786, 789, 793, 798

(56) References Cited

U.S. PATENT DOCUMENTS

| | | | |
|---|---|---|---|
| 3,657,620 | * | 4/1972 | Fricker .......................... 318/221 E |
| 3,657,621 | * | 4/1972 | Fink, Jr. et al. ................ 318/221 E |
| 3,740,631 | * | 6/1973 | Fricker et al. ................ 318/221 E |
| 3,792,324 | * | 2/1974 | Suarez et al. ................ 318/221 E |
| 3,882,364 | * | 5/1975 | Wright et al. ................ 318/221 R |
| 3,916,274 | * | 10/1975 | Lewus ............................ 318/221 E |
| 3,970,908 | * | 7/1976 | Hansen et al. ................ 318/221 R |
| 4,047,082 | * | 9/1977 | Scheuer et al. ................ 318/221 E |
| 4,395,671 | | 7/1983 | Sandler et al. ................ 318/786 |
| 4,496,895 | * | 1/1985 | Kawate et al. ................ 318/781 |
| 4,622,506 | * | 11/1986 | Shemanske et al. ............ 318/786 |
| 4,658,195 | * | 4/1987 | Min ............................... 318/786 |
| 4,786,850 | * | 11/1988 | Chmiel .......................... 318/786 |
| 4,804,901 | * | 2/1989 | Pertessis et al. ................ 318/786 |
| 4,820,964 | | 4/1989 | Kadah et al. .................. 318/786 |
| 4,843,295 | | 6/1989 | Thompson et al. ............ 318/786 |
| 5,017,853 | * | 5/1991 | Chmiel .......................... 318/786 |
| 5,103,154 | * | 4/1992 | Dropps et al. ................ 318/782 |
| 5,162,718 | | 11/1992 | Shroeder ........................ 318/794 |
| 5,206,573 | | 4/1993 | McCleer et al. ................ 318/787 |
| 5,227,710 | * | 7/1993 | Lewus ............................ 318/781 |
| 5,247,236 | | 9/1993 | Schroeder ...................... 318/794 |
| 5,296,795 | | 3/1994 | Dropps et al. ................ 318/778 |
| 5,483,139 | * | 1/1996 | Welles, II ...................... 318/782 |
| 5,528,120 | * | 6/1996 | Brodetsky ...................... 318/785 |
| 5,561,357 | | 10/1996 | Schroeder ...................... 318/789 |
| 5,589,753 | | 12/1996 | Kadah et al. .................. 318/785 |
| 5,811,955 | | 9/1998 | Kachuk .......................... 318/786 |
| 6,034,503 | * | 3/2000 | Pertessis ........................ 318/785 |

* cited by examiner

Primary Examiner—Robert E. Nappi
Assistant Examiner—Rina I. Duda
(74) Attorney, Agent, or Firm—Bernhard P. Molldrem, Jr.

(57) ABSTRACT

A start circuit for a single-phase AC motor controls the current through the start or auxiliary winding based on time rate of change of voltage or current, or based on the current or voltage dropping or rising some fraction from inrush value, i.e., to 50% of initial start current or to 150% of initial start voltage. The circuit can also include a default timer to time out the start current after some preset period between 300 and 1000 milliseconds.

12 Claims, 3 Drawing Sheets

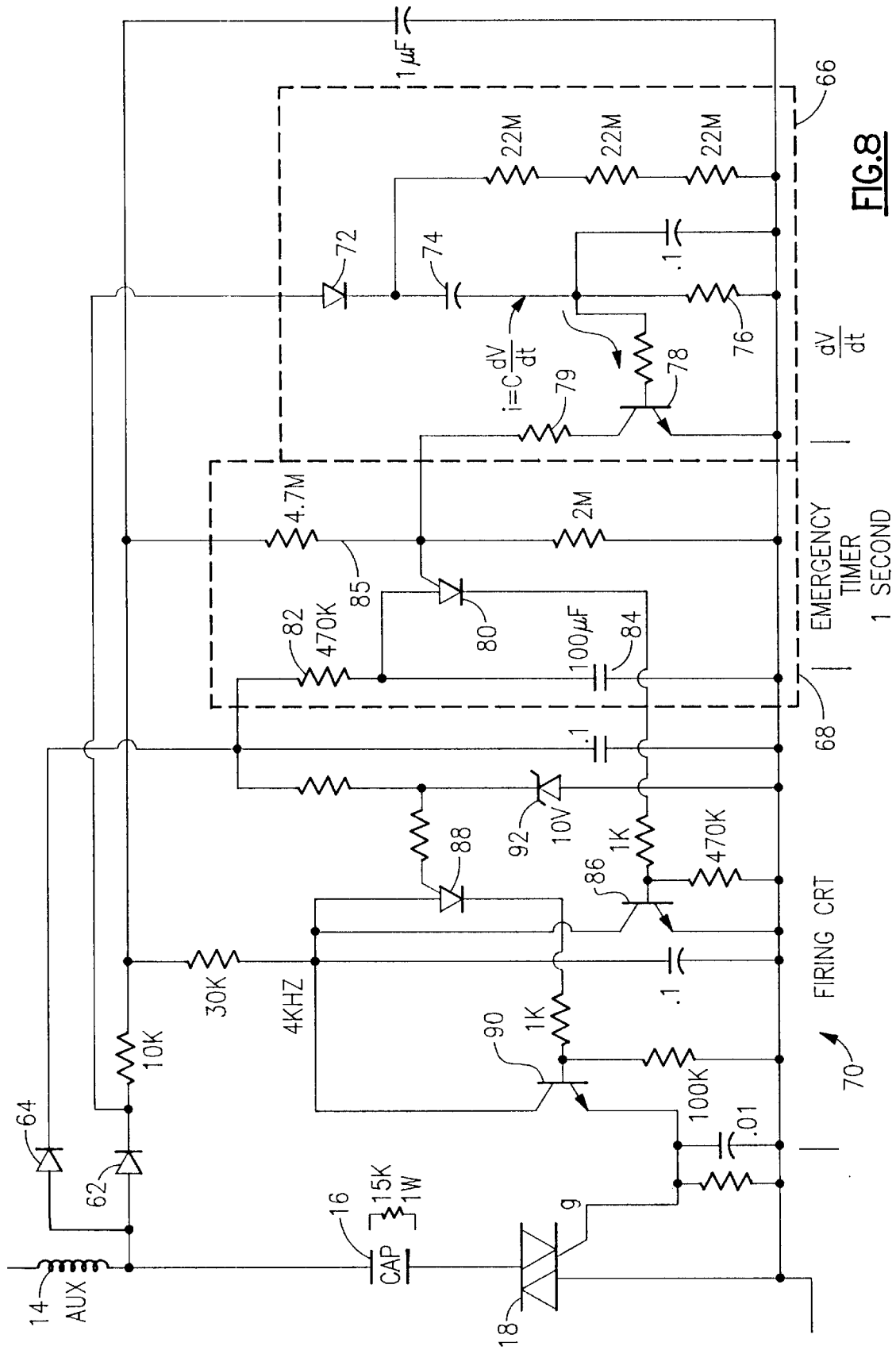

TIME RATE OF CHANGE MOTOR START CIRCUIT

BACKGROUND OF THE INVENTION

The present invention relates to single-phase AC induction motors, and in particular to a solid-state motor start circuit that controls flow of AC current to the motor auxiliary or start winding when the motor is started up.

At start up, AC single-phase induction motors require some sort of starting mechanism to rotate the magnetic field of the field windings, so as to generate sufficient torque to start the rotor. The starting mechanism enables the rotor to overcome the static forces associate with accelerating the rotor and its associated load. Different motors require different amount of additional torque at start up. Also, the amount of auxiliary current required depends on initial load conditions, and on the quality of the AC power.

The typical AC induction motor armature is equipped with two sets of windings, namely, one or more main or run windings for driving the motor at normal operating speed, and an auxiliary or start winding to generate the required starting torque. In order to provide the necessary rotating magnetic field for start-up, a phase shift device such as a capacitor is connected in series with the start winding. During start-up, both the run winding(s) and the auxiliary or start winding(s) are energized to bring the motor up to a sufficient operating speed. At that point, the start or auxiliary winding either drops out of circuit so that the motor operates on the run windings alone, or can be connected to a run capacitor but cut off from the start capacitor. In the event that a heavy load is encountered, and the motor rpm drops below its design operating speed or stalls, the auxiliary winding can be cut back in to increase motor torque, and overcome the increased load.

In most AC induction motors, the structure of the auxiliary winding is such that sustained connection to the AC line voltage could cause overheating and damage. For capacitor-type motors, the start capacitor can also suffer damage from sustained connection. Therefore, the start winding has to both connect and disconnect at the proper times, at start-up and afterwards.

Because of the relatively short operating life of centrifugal switches and other electromechanical devices, current and voltage sensing circuits have been employed to control auxiliary or start current. These can include a reed-switch/triac combination, as described in Fink et al. U.S. Pat. No. 3,766,457, or a current-sense-resistor based circuit as described in Lewus U.S. Pat. No. 3,916,275. Another solid-state motor start circuit is described in Kadah U.S. Pat. No. 4,820,964, in which a solid-state switch, such as a triac, controls the start current, and in which the switch is gated by a photosensitive element. In Kadai et al. U.S. Pat. No. 5,589,753, a start circuit for a single-phase AC induction motor uses a triac in series with the motor auxiliary winding, and which turns on in response to an increase in the time rate of change of auxiliary voltage.

A few simplified start circuits have been proposed but each of these has to be tailored to the motor it is associated with. These typically act to shut the start current off after the applied voltage, which is low during surge or inrush conditions at start-up, rises to some fixed voltage level. In one version, the AC voltage seen at the start capacitor is integrated, and this gates off a triac or similar switch when the voltage reaches a predetermined level. A timer may be also associated with this circuit to shut the start circuit off after some predetermined time has elapsed, for example, 300 milliseconds. Unfortunately, on many occasions, the quality of the input power may be poor, i.e., during "brownouts," in which the input voltage brings the motor up to speed very slowly. Also, the load conditions on the same motor may vary from one occasion to another. These start circuits have to be designed for worst-case conditions, however, and this means that for most other conditions more start current is applied to the auxiliary winding than is necessary, and can stress the motor.

OBJECTS AND SUMMARY OF THE INVENTION

It is an object of this invention to provide a motor start circuit for a single-phase AC induction motor and which avoids the drawbacks of the prior art.

It is another object to provide a start circuit that does not rely simply on the applied power attaining a preset voltage or current level, and which can accommodate a wide range of motors, power quality conditions, and load conditions.

It is a further object of the invention to provide a motor start circuit that is simple and inexpensive, and which can be installed on an existing motor as an after-market part.

According to one aspect of this invention, a motor start circuit for a single-phase AC induction motor employs a triac or other equivalent switch means in series with the auxiliary winding to permit AC current through the auxiliary winding to start the motor. The triac shuts off AC current through the auxiliary winding when the motor has commenced running. A sensor arrangement senses either motor current through one or both of the main and auxiliary windings or else senses voltage across the auxiliary winding. The sensor provides either a motor current signal or a motor voltage signal, respectively. A gating arrangement receives this signal and is connected with a gate of said switch triac or switch means for shutting off the auxiliary current means when the signal indicates that the motor current has dropped to or below a predetermined fraction (i.e., 50%) of initial motor current $I_{init}$, or alternatively, when the signal indicates that the voltage has risen to some fraction above initial or inrush current $V_{init}$, e.g. 150% $V_{init}$. The term "predetermined" as used here is not limited to a factory preset value, but may be user adjusted, or automatically adjusted, depending on circuit design. The term "predetermined" can also mean a proportional value within the scope of this invention.

According to another aspect of the invention, a motor start circuit for a single-phase AC induction motor employs switch means in series with the auxiliary winding to permit AC start current to flow through the auxiliary winding to start the motor, and shuts off start current when the motor has commenced running. A sensor means senses either motor current or motor voltage, and provides a signal representing magnitude of the sensed motor current or voltage, respectively. A differentiator is supplied with this signal to produce a dI/dt signal representing the time rate of change of motor current or a dV/dt signal representing the time rate of change of motor voltage. There are gating means that receive the time rate of change signal, dI/dt or dV/dt, connected with a gate of said switch means turns off the switch means when said dI/dt or dV/dt signal drops to or below (or, alternatively, rises to or beyond) a predetermined value. Preferably a default timer is employed that turns off the switch means after a predetermined time period, e.g., 300 msec to 1 second, from commencement of flow of motor current.

The start circuit of this invention can be implemented with standard analog elements, i.e., transistors, capacitors, diodes, and resistors, or it can be implemented digitally, i.e., in a microprocessor.

The above and many other objects, features, and advantages of this invention will present themselves to persons skilled in the art from the ensuing detailed description of a preferred embodiment of the invention, when read in conjunction with the accompanying Drawing.

BRIEF DESCRIPTION OF THE DRAWING

FIG. 8 is a circuit diagram of another embodiment of this invention.

DETAILED DESCRIPTION OF THE PREFERRED EMBODIMENT

Figure 1:
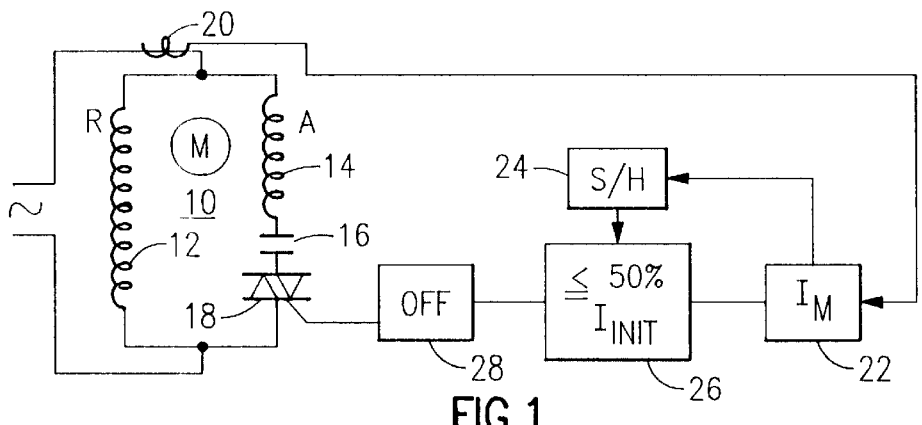
FIG. 1 is a block diagram of a motor start circuit based on motor current dropping to or below some predetermined fraction of inrush motor current.

With reference to the Drawing, FIG. 1 schematically illustrates a motor start circuit according to one possible embodiment of this invention. Here, an AC single-phase induction motor 10 is shown with a run winding 12 connected between a part of AC input conductors, and a start circuit in which an auxiliary or start winding 14 is connected in series with a start capacitor 16 and a switching device 18, e.g., a triac, between the AC conductors. As shown here, a pickup coil 20, i.e., a toroid or similar coil, picks up a signal that is proportional to the level of the AC motor current through the run and auxiliary windings 12, 14, and furnishes this to a detector circuit 22 that produces a signal $I_M$ that represents the magnitude of the motor current. A sample-hold circuit 24 is actuated at the commencement of current flow and holds a level $I_{INIT}$ that represents the initial or surge current level. A comparator 26 tests to determine when the motor current signal $I_M$ has dropped from the initial level to some fraction, i.e., 50% of the initial level $I_{INIT}$. When that occurs, a turn-off circuit 28 sends a gating signal to shut off the triac or other switching device, and turn off the current to the auxiliary winding. Of course, the elements 22, 24, 26, and 28 can be implemented either with linear components, or can be implemented digitally.

Figure 2:
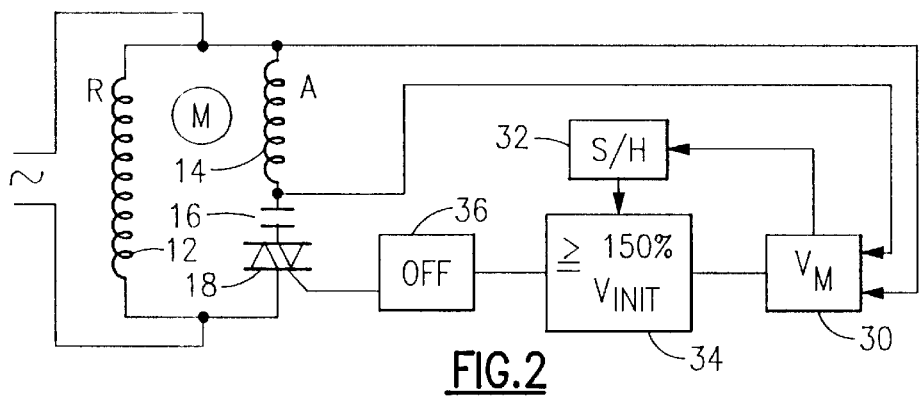
FIG. 2 is a block diagram of a motor start circuit based on motor (auxiliary) voltage rising to a level that is some predetermined fraction above inrush motor voltage.

FIG. 2 shows another possible embodiment, but which operates in response to a predetermined rise in motor auxiliary voltage from the initial or surge voltage level. Here, the AC single-phase induction motor 10 is shown with its run winding 12, auxiliary or start winding 14, start capacitor 16 and switching device 18 (e.g. triac) connected between the AC conductors, as before. As shown here, the level of the AC motor voltage across some component, i.e., the start or run capacitor, or auxiliary windings 12, 14, is supplied via a conductor to a voltage detector circuit 30 that produces a signal $V_M$ that represents the magnitude of the motor voltage. A sample-hold circuit 32 is actuated at the commencement of current flow and holds a level $V_{INIT}$ that represents the initial or surge voltage level. A comparator 34 tests to determine when the motor voltage signal $V_M$ has risen at least some fraction over its initial level to some higher level, i.e., 150% of the initial level $V_{INIT}$. When that occurs, a turn-off circuit 36 sends a gating signal to shut off the triac or other switching device, and turn off the current to the auxiliary winding 14.

Figure 3:
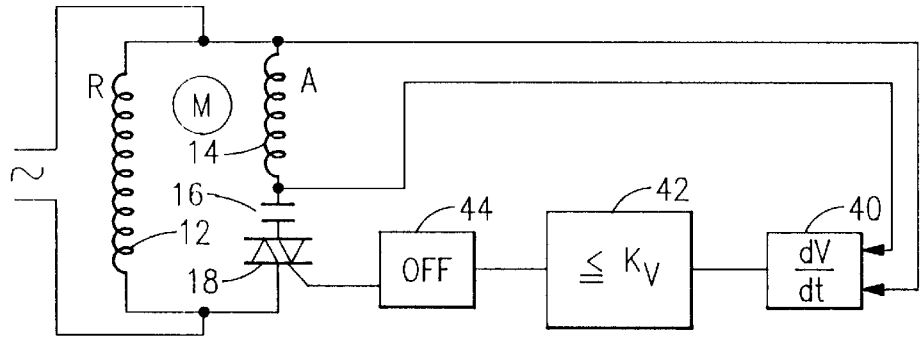
FIG. 3 is a block diagram of a motor start circuit based on time rate of change of motor voltage rising to or above some predetermined threshold.
Figure 4:
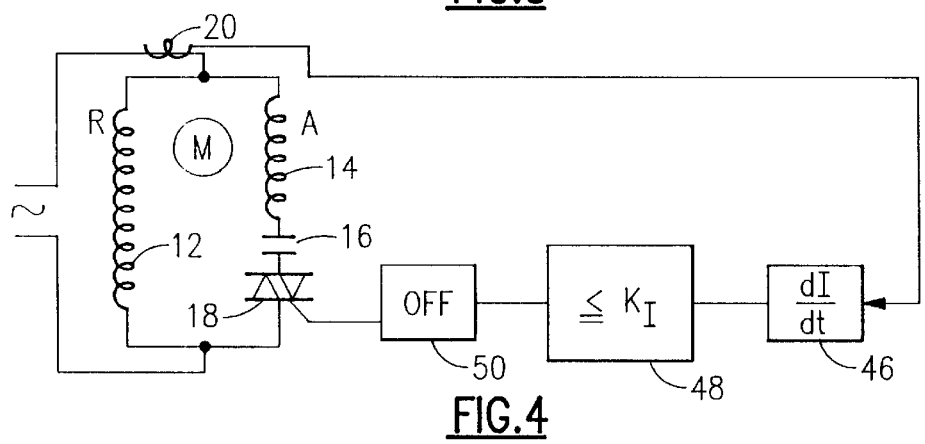
FIG. 4 is a block diagram of a motor start circuit based on time rate of change of motor current dropping to or below some predetermined threshold.

FIGS. 3 and 4 represent embodiments in which a time rate of change of the voltage magnitude V or current magnitude I are employed to control the current flow through the auxiliary winding. In these embodiments, the motor run winding 12, auxiliary winding 14, capacitor 16 and triac 18 are connected generally as described previously. In FIG. 3, a differentiator circuit 40 differentiates the motor voltage magnitude V, which rises from an initial low surge level $V_{INIT}$ to a steady-state level when the motor 10 is running at speed. This circuit produces a differential signal dV/dt, that increases as the motor speed picks up. A comparator circuit 42 signals a turn-off circuit 44 when the differential signal rises above some pre-set constant $K_V$, i.e., $(dV/dt) \geq K_V$. When this occurs, the turn-off circuit gate off the triac 18.

In FIG. 4, the current pick-up coil 20 feeds a motor current differentiator 46, which produces a differential signal dI/dt that represents the time rate of change of the motor current magnitude $I_M$. The motor $I_M$ current commences at a high surge level $I_{INIT}$, and then drops to a low steady-state level as the motor picks up speed, at which time the differential dI/dt approaches zero. A differentiator circuit 48 signals a turn-off circuit 50 to gate off the triac 18 when the motor current rate of change drops below a pre-set constant level, i.e., $(dI/dt) \leq K_I$.

The behavior of the current-controlled embodiments (FIGS. 1 and 4) can be explained with reference to the motor current chart of FIG. 5, and the voltage-controlled embodiments (FIGS. 2 and 3) can be explained with reference to the motor voltage chart of FIG. 6.

Figure 5:
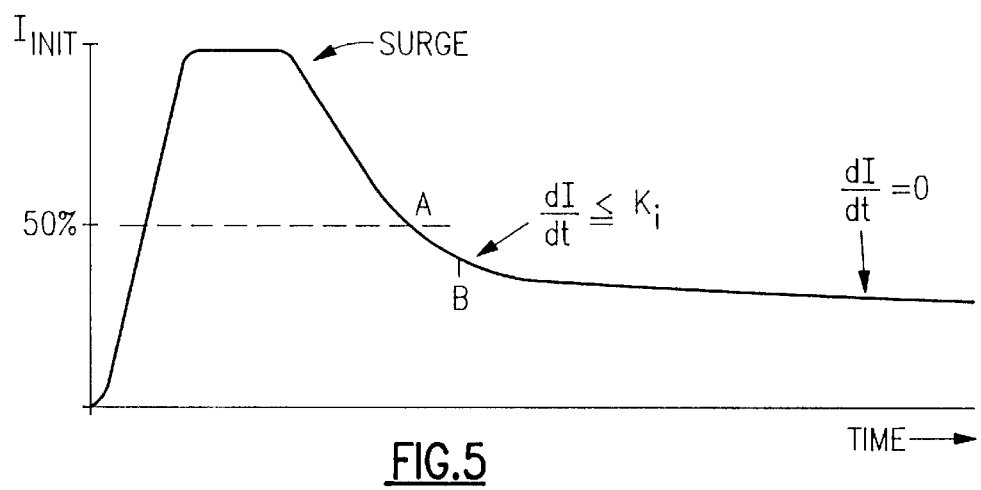
FIG. 5 is a plot of motor current magnitude over time showing initial inrush current and steady state current.

As shown in FIG. 5, there is an initial surge current through the coils 12 and 14 just after the AC current is applied, because of the absence of any reverse EMF from the rotor. After a peak level $I_{INIT}$, the current level drops as the motor 10 starts to turn, and then reaches a steady state level, i.e., (dI/dt)=0. The actual shape of this curve depends on variable conditions such as the input AC power quality and the motor load. The FIG. 1 embodiment has a cut-off point A for gating off the start current, where the current has dropped to a fixed percentage (here, 50%) of $I_{INIT}$. The FIG. 4 embodiment has a cut-off point B where the slope of the current magnitude curve has flattened somewhat, i.e., to $(dI/dt)=K_I$.

Figure 6:
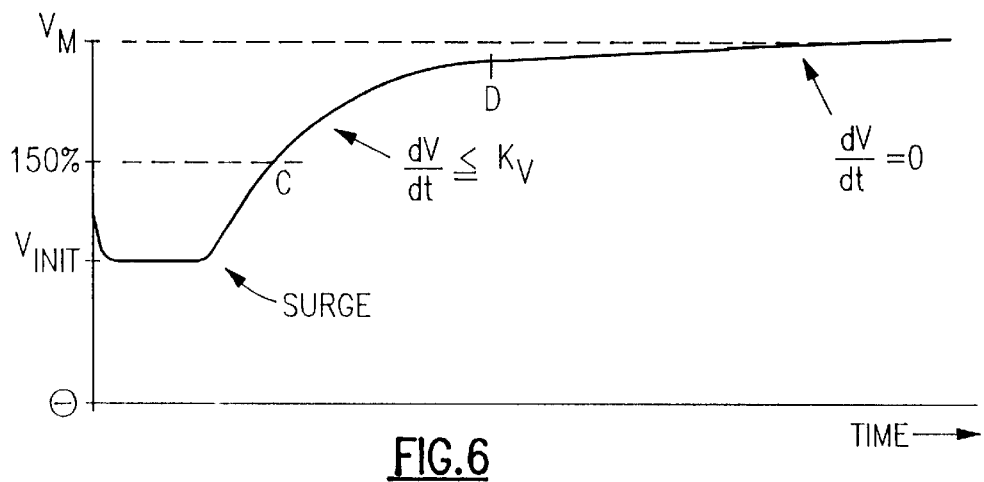
FIG. 6 is a plot of motor (auxiliary) voltage magnitude over time showing initial inrush voltage by and steady state voltage.

As shown in FIG. 6, there is an initial reduced voltage $V_{INIT}$ through the coil 14 just after the AC current is applied, corresponding to the high surge current of FIG. 5. After the minimum or dip level $V_{INIT}$, the voltage magnitude rises as the motor 10 starts to turn, and then reaches a steady state level, i.e., (dV/dt)=0. As with FIG. 5, the actual shape of the FIG. 6 curve depends on variable conditions such as the input AC power quality and the motor load. The FIG. 6 embodiment has a cut-off point C for gating off the start current, where the voltage has risen to a fixed percentage above initial voltage $V_{INIT}$ (here, 150%). The FIG. 6 embodiment has a cut-off point D where the slope of the voltage magnitude curve has flattened somewhat, i.e., to $(dV/dt)=K_V$.

Each of these embodiments can also include a default timer e.g., emergency timer circuit 68 of FIG. 8 that times out the triac 18 after some preset time, e.g., 300 milliseconds to 1 second. Each of the motors can also include a thermal protection device that shuts it off in case of a stall or overheating.

Figure 7:
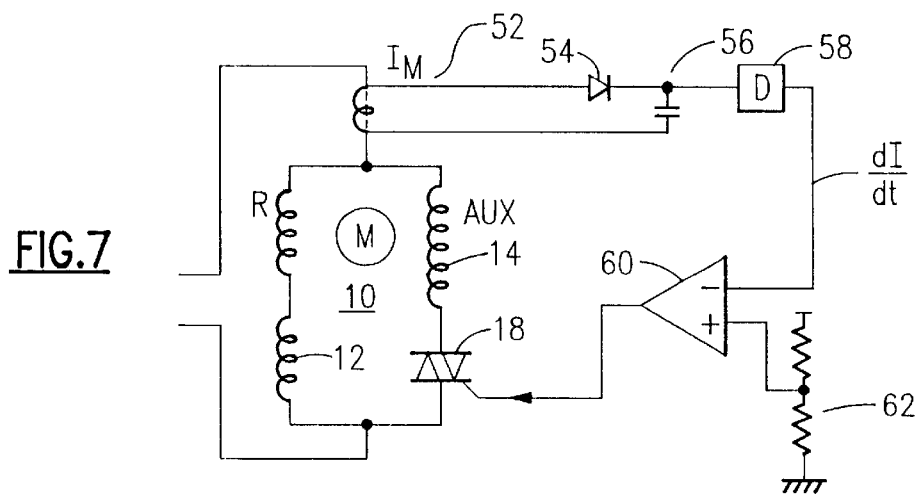
FIG. 7 is a circuit diagram of an embodiment of this invention.

An example of a current time rate of change start circuit is shown in FIG. 7. Here, a sensor toroid 52 picks up a motor current signal $I_M$ and this is supplied through a diode 54 to one side of a capacitor 56 as the magnitude of the motor current. A differentiator 58 then produces a signal dI/dt representing the time rate of change of motor current, and this is provided to one input of a comparator 60. The other input of the comparator 60 is provided with a proportional reference level, here from a divider 62. When the differential signal dI/dt drops below the level of the divider reference voltage, the comparator output goes low, and this turns off the triac 18.

Another embodiment of this invention is shown in more detail in FIG. 8. At the left of this view are the auxiliary winding 14, the start capacitor 16 and the switch or triac 18, arranged in series between the two AC power conductors. At the junction between the auxiliary winding 14 and the capacitor 16, or at the top of the capacitor 16, a voltage signal is derived and fed through a rectifier 62 and a second rectifier 64. The circuit is conveniently considered in modules or circuit portions as set out in dash lines, namely, a voltage rate of change circuit or dV/dt circuit 66; an emergency timer circuit 68, and a firing circuit 70 that is responsible for gating the triac 18. The dV/dt circuit 66 includes a series circuit of a diode 72, a capacitor 74, and a resistor 76, connected between the anode of the rectifier 62 and the lower rail AC conductor. The junction of the capacitor 74 and resistor 76 supplies base current to a grounded-emmiter transistor 78. The emergency timer circuit 68 includes a programmable unijunction transistor or PUT 80 whose anode is connected to a junction of a timing resistor 82 and timing capacitor 84. These have values selected so that the PUT 80 turns on after about a thousand milliseconds. The gate electrode of this PUT is connected to a resistor voltage divider 85 and also to the collector of the transistor 78. The cathode of the PUT 80 supplies the base of a transistor 86 in the firing circuit 70. The collector of this transistor 86 is connected with the anode of another PUT 88, whose cathode terminal feeds an output emitter follower transistor 90. The gate of the PUT 88 is tied to a fixed potential, here a zener 92. The emitter of the transistor 90 goes low to turn off the triac 18.

When the motor is connected in circuit, and the diodes 62 and 64 are energized, the gate of the triac 18 goes high, and turns on AC power to the auxiliary winding 14 and start capacitor 16. Current also starts to flow to charge up the timing capacitor 84, so that the voltage on the anode of PUT 80 starts to rise. Current also flows through the capacitor 74 to the base of the transistor 78, proportional to the rate of change of motor voltage, i.e., $I_{base}=C(dV/dt)$. The transistor 78 remains in conduction until the base current has dropped to a low value. From start up, the gate voltage on the PUT 80 is determined by voltage divider 85, here formed of a 4.7 M resistor and a 2 M resistor. Once capacitor 74 is initially charged, the transistor 78 goes off. The gate voltage of the PUT 80 is determined by the ratio of the divider 85. Any subsequent dV/dt rise in capacitor 74 biases the transistor 78 on, and changes the voltage dividing ratio at the gate of PUT 80 to a low value (e.g., 300K÷[4.7 M+300 K]). This times out the PUT 80 immediately. If there are severe load conditions, and the transistor 78 remains off for longer than the time constant of the PUT 80, then the emergency timer will trip at about one second, to trigger the firing circuit 70 and shut off the triac 18.

Here, the circuit is implemented with various transistors, resistors, capacitors, and other discrete elements. However, the circuit as shown here could be implemented using a microprocessor to carry out the same functions. For example, a microprocessor can be employed to carry out some of the detection and timing functions of the embodiment of FIG. 8.

Also, while the embodiments described above do not incorporate a re-start feature, it would not be difficult to add re-start to these circuits. For example, in the embodiments of FIGS. 1 to 4, restart can be initiated when there is a significant change in dV/dt or dI/dt. In the case of a microprocessor implementation, this feature could be achieved with one or two additional lines of code.

While the invention has been described here with reference to several preferred embodiments, it should be recognized that the invention is not limited to those precise embodiments. Rather, many modifications and variations will present themselves to persons skilled in the art without departing from the scope and spirit of this invention, as defined in the appended claims.

I claim:

1. Motor start circuit for a single-phase AC induction motor of the type having a main run winding and an auxiliary start winding; the motor start circuit comprising switch means in series with said auxiliary winding permitting AC current through the auxiliary winding to start the motor and shutting off AC current through the auxiliary winding when the motor has commenced running;

sensor means for sensing total motor current through both of the main and auxiliary windings and providing a motor current signal representing magnitude of the sensed total motor current;

differentiator means supplied with said motor current signal to produce a dI/dt signal at an output thereof representing the time rate of change of said total motor current signal; and gating means receiving from said output said dI/dt signal and connected with a gate of said switch means for turning off said switch means when said dI/dt signal changes to or below a predetermined value.

2. Motor start circuit according to claim 1, wherein said gating means turns off said switch means when said dI/dt signal drops to or below a predetermined value.

3. Motor start circuit according to claim 1, wherein said gating means turns off said switch means when said dI/dt signal rises to or above a predetermined value.

4. Motor start circuit according to claim 1, further comprising a default timer for turning off said switch means after a predetermined time period from commencement of flow of motor current.

5. Motor start circuit for a single-phase AC induction motor of the type having a main run winding and an auxiliary start winding; the motor start circuit comprising switch means in series with said auxiliary winding permitting AC current through the auxiliary winding to start the motor and shutting off AC current through the auxiliary winding when the motor has commenced running;

sensor means for sensing auxiliary winding voltage across the auxiliary winding and providing a voltage signal representing magnitude of the sensed auxiliary winding voltage;

differentiator means supplied with said motor voltage signal to produce a dV/dt signal a tan output thereof representing the time rate of change of said voltage signal; and gating means receiving from said output said dV/dt signal and connected with a gate of said switch means for turning off said switch means when said dV/dt signal changes to or below a predetermined value.

6. Motor start circuit according to claim 5, wherein said gating means turns off said switch means when said dV/dt signal drops to or below a predetermined value.

7. Motor start circuit according to claim 5, wherein said gating means turns off said switch means when said dV/dt signal rises to or above a predetermined value.

8. Motor start circuit according to claim 5, further comprising a default timer for turning off said switch means after a predetermined time period from commencement of flow of motor current.

9. Motor start circuit for a single-phase AC induction motor of the type having a main run winding and an auxiliary start winding, and in which leads of said auxiliary start winding are available for connection to the motor start circuit, the motor start circuit comprising:

switch means to be connected in series with said auxiliary winding permitting AC current through the auxiliary winding to start the motor and shutting off AC current through the auxiliary winding when the motor has commenced running;

sensor means having leads to be connected to said leads of said auxiliary start winding for sensing voltage across auxiliary start winding and providing an auxiliary voltage signal representing magnitude of the sensed auxiliary voltage;

differentiator means supplied with said auxiliary winding voltage signal to produce a dV/dt signal representing the time rate of change of said auxiliary winding voltage signal; and gating means receiving said dV/dt signal and connected with a gate of said switch means for turning off said switch means when said dV/dt signal deviates by a predetermines amount from an initial value thereof;

wherein said differentiator means includes a capacitor having a capacitance C, connected in series with a gate of a transistor, such that gate current I to the transistor is proportional to the rate of change of said voltage signal, I=C(dV/dt), and said transistor having an output level controlling actuation of said gating means.

10. Motor start circuit for a single-phase AC induction motor of the type having a main run winding and an auxiliary start winding, and in which leads of said auxiliary start winding are available for connection to the motor start circuit, the motor start circuit comprising:

switch means to be connected in series with said auxiliary winding permitting AC current through the auxiliary winding to start the motor and shutting off AC current through the auxiliary winding when the motor has commenced running;

voltage sensor having leads to be connected to said leads of said auxiliary start winding for sensing auxiliary winding voltage across auxiliary start winding and providing a voltage signal representing magnitude of the sensed auxiliary winding voltage;

differentiator means supplied with said auxiliary winding voltage signal to produce a dV/dt signal at an output thereof representing the time rate of change of said auxiliary winding voltage signal; and gating means receiving said dV/dt signal from said output and connected with a gate of said switch means for turning off said switch means when said dV/dt signal deviates from an initial value of said dV/dt signal by a predetermined amount.

11. A motor start circuit for a single-phase AC induction motor which operates in response to a rise in motor auxiliary voltage from an initial surge level of auxiliary voltage; the induction motor having a main run winding and an auxiliary start winding; the motor start circuit comprising switch means in series with said auxiliary winding permitting AC current through the auxiliary winding to start the motor and shutting off AC current through the auxiliary winding when the motor has commenced running;

a voltage detector connected across said auxiliary winding and providing an auxiliary voltage signal representing magnitude of the sensed auxiliary winding voltage;

storage means for storing an initial value representing the initial surge level of said auxiliary voltage;

a comparator with inputs sensitive to said auxiliary voltage signal and to said stored initial value on said storage means; and gating means connected to an output of said comparator and with a gate of said switch means for turning off said switch means when said comparator indicates that said auxiliary winding voltage has risen to or above a predetermined fraction increase over the initial surge level of the auxiliary voltage.

12. The motor start circuit of claim 11, wherein said storage means includes a sample/hold circuit actuated at the commencement of current flow through said auxiliary winding to hold the level that represents the initial surge level of the auxiliary voltage.

* * * * *

UNITED STATES PATENT AND TRADEMARK OFFICE
CERTIFICATE OF CORRECTION

PATENT NO.    : 6,320,348 B1
DATED         : November 20, 2001
INVENTOR(S)   : Andrew S. Kadah Page 1 of 1

It is certified that error appears in the above-identified patent and that said Letters Patent is hereby corrected as shown below:

<u>Column 1,</u>
Line 53, "Kadai" should read -- Kadah --

<u>Column 6,</u>
Line 65, "a tan" should read -- at an --

Signed and Sealed this

Nineteenth Day of March, 2002

Attest:

JAMES E. ROGAN
*Attesting Officer*          *Director of the United States Patent and Trademark Office*